United States Patent
Park et al.

(10) Patent No.: US 10,987,816 B2
(45) Date of Patent: Apr. 27, 2021

(54) PASSIVE STIFFNESS GRIPPER

(71) Applicant: KOREA INSTITUTE OF MACHINERY & MATERIALS, Daejeon (KR)

(72) Inventors: Dong-il Park, Daejeon (KR); Chan-hun Park, Daejeon (KR); Hwi-su Kim, Daejeon (KR); Hyun-min Do, Daejeon (KR); Dong-won Yun, Daejeon (KR); Tae-yong Choi, Daejeon (KR); Jin-ho Kyung, Daejeon (KR); Young-su Son, Daejeon (KR); Byung-in Kim, Daejeon (KR); Doo-hyeong Kim, Sejong (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 252 days.

(21) Appl. No.: 16/083,760

(22) PCT Filed: Mar. 23, 2017

(86) PCT No.: PCT/KR2017/003111
§ 371 (c)(1),
(2) Date: Sep. 10, 2018

(87) PCT Pub. No.: WO2017/171303
PCT Pub. Date: Oct. 5, 2017

(65) Prior Publication Data
US 2019/0091877 A1    Mar. 28, 2019

(30) Foreign Application Priority Data

Apr. 1, 2016    (KR) .................. 10-2016-0039928
Apr. 1, 2016    (KR) .................. 10-2016-0039952
Apr. 1, 2016    (KR) .................. 10-2016-0039999

(51) Int. Cl.
*B25J 9/14*    (2006.01)
*B25J 15/04*    (2006.01)
(Continued)

(52) U.S. Cl.
CPC .................. *B25J 15/04* (2013.01); *B25J 9/14* (2013.01); *B25J 9/16* (2013.01); *B25J 9/1694* (2013.01);
(Continued)

(58) Field of Classification Search
CPC ......... A61B 34/30; A61B 34/37; A61B 34/71; A61B 2034/107; A61B 34/74;
(Continued)

(56) References Cited

U.S. PATENT DOCUMENTS 4,694,230 A * 9/1987 Slocum .................. G05B 19/42
                                                    318/568.17
4,957,320 A * 9/1990 Ulrich ...................... B25J 9/102
                                                       192/56.1
(Continued)

FOREIGN PATENT DOCUMENTS

JP    19945828 A    1/1994
JP    11033834 A    2/1999
(Continued)

OTHER PUBLICATIONS

Sangcheol Lee, "Development of a Variable Repote Center Compliance(VRCC) with Stiffness Adjusting Rods", Journal of Control, Automations, and Systems Engineering vol. 11, No. 8, Aug. 2005, pp. 703-708.
(Continued)

*Primary Examiner* — McDieunel Marc
(74) *Attorney, Agent, or Firm* — Hauptman Ham, LLP

(57) ABSTRACT

A passive compliance gripper includes a passive compliance part, a displacement measuring element and a gripper
(Continued)

mount. A first end of the passive compliance part is fixed, and a second end of the passive compliance part is configured to be transformed. The displacement measuring element is equipped to the passive compliance part, and measures displacement due to transformation of the passive compliance part. The gripper mount is connected to the second end of the passive compliance part, and has a gripper part gripping a component.

18 Claims, 16 Drawing Sheets

(51) Int. Cl.
  *B25J 9/16*     (2006.01)
  *B25J 17/02*    (2006.01)
  *B25J 19/02*    (2006.01)

(52) U.S. Cl.
  CPC ....... *B25J 17/0208* (2013.01); *B25J 17/0216* (2013.01); *B25J 19/02* (2013.01)

(58) Field of Classification Search
  CPC .. A61B 2034/2055; A61B 2017/00314; A61B 2017/2939; A61B 5/4528; A61B 6/0464; A61B 8/4218; H01L 41/1138; A61H 2201/5061; A61H 2201/5069; A61H 1/0277; A61H 2201/5043; A61H 2201/1246; B25J 13/00; B25J 15/022; B25J 9/003; B25J 9/042; B25J 9/106; B25J 9/1653; B25J 13/084; B25J 15/0009; B25J 9/102; B25J 15/04; B25J 17/0208; B25J 17/0216; B25J 19/02; B25J 9/14; B25J 9/16; B25J 9/1694; A61M 25/0155; Y10S 901/15; Y10S 901/29; Y10S 294/907; A61F 2002/7625; A61F 2002/5018; A61F 2002/503; A61F 2002/5036; A61F 2002/745; A63B 2220/51; A63B 2200/56; B26B 19/388; G01B 5/0007; A61G 13/04; B62D 33/0636; B01L 2200/025; G01F 23/26; G01N 2035/00851; G01N 2035/1013; G01N 35/1011; G05B 2219/39319; H02K 2201/18

See application file for complete search history.

(56) References Cited

U.S. PATENT DOCUMENTS

| | | | | |
|---|---|---|---|---|
| 5,501,498 A * | 3/1996 | Ulrich | ............... | B25J 13/084 294/106 |
| 6,330,837 B1 * | 12/2001 | Charles | ............... | B25J 11/00 74/490.06 |
| 6,741,912 B2 * | 5/2004 | Olesen | ............... | B23Q 1/5462 180/8.1 |
| 6,804,579 B1 * | 10/2004 | Laski | ............... | B08B 3/024 318/568.11 |
| 7,706,922 B2 * | 4/2010 | Ueno | ............... | B25J 9/1623 700/262 |
| 8,840,848 B2 * | 9/2014 | Kraihanzel | ...... | G01N 35/00732 422/417 |
| 2007/0173788 A1 * | 7/2007 | Schena | ............... | A61B 34/30 606/1 |
| 2011/0319913 A1 * | 12/2011 | Labadie | ............... | A61B 34/30 606/130 |
| 2014/0311271 A1 * | 10/2014 | Cao | ............... | B25J 17/025 74/490.05 |
| 2015/0173840 A1 * | 6/2015 | Lohmeier | ............... | A61B 34/76 606/130 |
| 2016/0221189 A1 * | 8/2016 | Nilsson | ............... | B25J 9/1653 |
| 2017/0042717 A1 * | 2/2017 | Agrawal | ............... | A61F 5/024 |

FOREIGN PATENT DOCUMENTS

| | | |
|---|---|---|
| KR | 100133995 B1 | 4/1998 |
| KR | 1020090011544 A | 2/2009 |
| KR | 101384306 B1 | 4/2014 |

OTHER PUBLICATIONS

International Search Report for PCT/KR2017/003111 dated Jun. 26, 2017.

* cited by examiner

PASSIVE STIFFNESS GRIPPER

BACKGROUND

1. Field of Disclosure

The present disclosure of invention relates to a passive compliance gripper, and more specifically the present disclosure of invention relates to a passive compliance gripper controlling a positioning error, a machining error and so on occurring in assembled objects so as to perform the assembly efficiently in an automate assembly process using an automate device such as a robot.

2. Description of Related Technology

A lot of manufacturing processes are automated by a robot, but an assembly process is hard to be automated by the robot. For example, all components of an assembled object are entirely same as geometrical information of drawings, all components of the assembled object are correctly positioned at predetermined positions of a working table, every component is correctly gripped to a predetermined position of a robot gripper, the robot is controlled with very correct position and posture, and then the assembly process for the components may be automated. However, in a real assembly process, the components of the assembled object are different from the sizes of the drawings, and the positioning error occurs, so that the automate assembly process may not be performed via merely controlling the position of the robot.

Accordingly, controlling the position of the robot may not perform the assembly process correctly, and thus various kinds of assembly robot via controlling a force in which a reaction force occurring in the assembly process is measured to be controlled, have been developed.

However, in the force controlling assembly process, a force sensor is disposed at an end portion of the robot and measures an assembly reaction force occurring in the assembly process, and then an entire movement of the robot is controlled and the assembly reaction force is controlled in the assembly process. Here, very expensive force-moment sensor with a 6-degree of freedom is necessary, and inertia is increases (inertia of the gripper is smaller than that of the robot) since the robot entirely moves for the assembly. In addition, an active force control is used so that a control algorithm may be diverged when unpredicted situation occurs in the assembly process, and thus stability or safety may be decreased. Further, in a first teaching for the assembly process, the robot may be hardly controlled to be positioned at a correct position in which the assembly process is performed, and thus the teaching for the assembly process may not be easily performed.

To solve the above-mentioned problem in the active force control for the robot, a remote compliance center (RCC) has been developed and has been additionally equipped to the end portion of the robot. In the RCC, the compliance necessary for the assembly is secured at the gripper even though the position of the robot is different from that of the assembled object, and thus the reaction force between the gripper and the assembled object occurring in the assembly process may be properly and effectively controlled.

However, displacement of an end portion of the gripper due to the compliance, is hard to be measured, and thus a robot controller may not find out a real position of the end portion of the robot. Here, in a horizontal-direction (perpendicular to a direction of the gravity) assembly, the robot controller may not find out a deflection of the end portion of the gripper due to the gravity, and thus a vertical-direction (parallel with the direction of the gravity) assembly may only be performed. For example, the compliance makes the displacement of the end portion of the gripper, but the displacement is hard to be measured, and thus the robot controller may not handle the above-mentioned problem. Here, the above-mentioned problem may be an obstacle to applying the RCC broadly and to perform the assembly process more effectively.

Further, the compliance should be increased or decreased based on conditions of the assembly process, but conventionally, the compliance may not be controlled. For example, when the positioning error or the machining error between the components of the assembled object is relatively low, stiffness should be increased for the compliance to be decreased for assembling more effectively. In contrast, when the positioning error or the machining error between the components of the assembled obstacle is relatively high, the stiffness should be decreased for the compliance to be increased for assembling more effectively.

Accordingly, the passive compliance gripper in which the rigidity may be controlled based on the assembly conditions should be developed.

A related prior art is Japanese laid-open patent application No. 1994-005828 (1994.01.25).

SUMMARY

The present invention is developed to solve the above-mentioned problems of the related arts. The present invention provides a passive compliance gripper capable of assembling more effectively via providing a passive compliance and flexibility to assembly circumstances, capable of measuring displacement of the gripper due to the flexibility by the passive compliance and using the measured displacement to an assembly process, capable of properly changing the compliance to be applied to various assembly circumstances more effectively, and capable of improving an assembly speed and quality of the assembly.

According to an example embodiment, a passive compliance gripper includes a passive compliance part, a displacement measuring element and a gripper mount. A first end of the passive compliance part is fixed, and a second end of the passive compliance part is configured to be transformed. The displacement measuring element is equipped to the passive compliance part, and measures displacement due to transformation of the passive compliance part. The gripper mount is connected to the second end of the passive compliance part, and has a gripper part gripping a component.

In an example, the passive compliance gripper may further include a gripper controller connected to the displacement measuring element, and including a displacement calculator calculating a position of a lower portion of the gripper part based on the displacement measured by the displacement measuring element.

In an example, the gripper controller may provide a target moving path and a target position of a robot to a robot controller, based on the position of the lower portion of the gripper part.

According to another example embodiment, a passive compliance gripper includes a passive compliance part, a variable compliance apparatus and a gripper mount. The passive compliance part forms compliance between first and second ends thereof and controls the compliance. The first end of the passive compliance part is fixed. The second end of the passive compliance part is configured to be transformed by the compliance. The variable compliance apparatus is equipped to the passive compliance part, and changes the compliance. The gripper mount is connected to the second end of the passive compliance part, and has a gripper part gripping a component.

In an example, the passive compliance part may include an upper structure, and a lower structure disposed under the upper structure, and spaced apart from the upper structure.

In an example, the upper structure and the lower structure may move relatively with a 6-degree of freedom.

In an example, the gripper part may be connected to a lower part of the lower structure.

In an example, the variable compliance apparatus may be a balloon which is disposed between the upper and lower structures and an inner pressure of which is controlled.

In an example, the balloon may include an elastic material.

In an example, the passive compliance gripper may further include a gripper controller connected to the balloon, and including a compliance controller controlling compliance of the balloon.

In an example, an inner groove may be formed on each of a lower surface of the upper structure and an upper surface of the lower structure, and upper and lower sides of the balloon may be respectively inserted and attached to the inner grooves.

In an example, a flow channel may be formed at the upper structure, a compressed air may be supplied and exhausted through the flow channel, and the balloon may be connected to the flow channel.

In an example, the passive compliance gripper may further include a displacement measuring element equipped to the passive compliance part, and measuring displacement due to transformation of the passive compliance part.

In an example, the passive compliance gripper may further include a gripper controller connected to the variable compliance apparatus, and controlling compliance of the variable compliance apparatus.

In an example, the gripper controller may be connected to the displacement measuring element, and may include a displacement calculator calculating a position of a lower portion of the gripper part based on the displacement measured by the displacement measuring element.

In an example, the gripper controller may further include a compliance calculator connected to the compliance controller and the displacement calculator. The compliance calculator may calculate compliance and the compliance controller may control the compliance of the variable compliance apparatus, based on the position of the lower portion of the gripper part calculated by the displacement calculator.

In an example, the gripper controller may provide a target moving path and a target position of a robot to a robot controller, based on the position of the lower portion of the gripper part.

In an example, the passive compliance part may include an upper structure, and a lower structure disposed under and spaced apart from the upper structure. The displacement measuring element may be equipped to each of legs which are stretchable and are connected to both ends of the upper and lower structures.

In an example, each of the legs may be linearly stretchable, and may provide a 3-degree of freedom to each of the upper and lower structures.

According to the present example embodiments, the variable passive compliance or the passive compliance may be provided for being properly applied to the positioning error and the machining error of the assembled object, and thus various assembly processes may be performed using the present example embodiments. Here, the displacement due to the compliance is measured to find out an assembly status more easily and thus proper compliance may be applied to each assembly circumstance. Thus, various kinds of assemblies such as vertical assembly, horizontal assembly, and so on, may be effectively performed.

In addition, compared to a conventional assembly system having an expensive force control based robot, the passive compliance gripper may apply to various kinds of robots such as a position control based robot, and fast assembly system may be completed without additional complex force control algorithm.

In addition, in assembly, the assembly status may be checked and a corrected assembly position may be provided to the robot for the effective assembly, and thus the path of the robot may be corrected and the assembly speed and the assembly quality may be enhanced.

Figure 1:
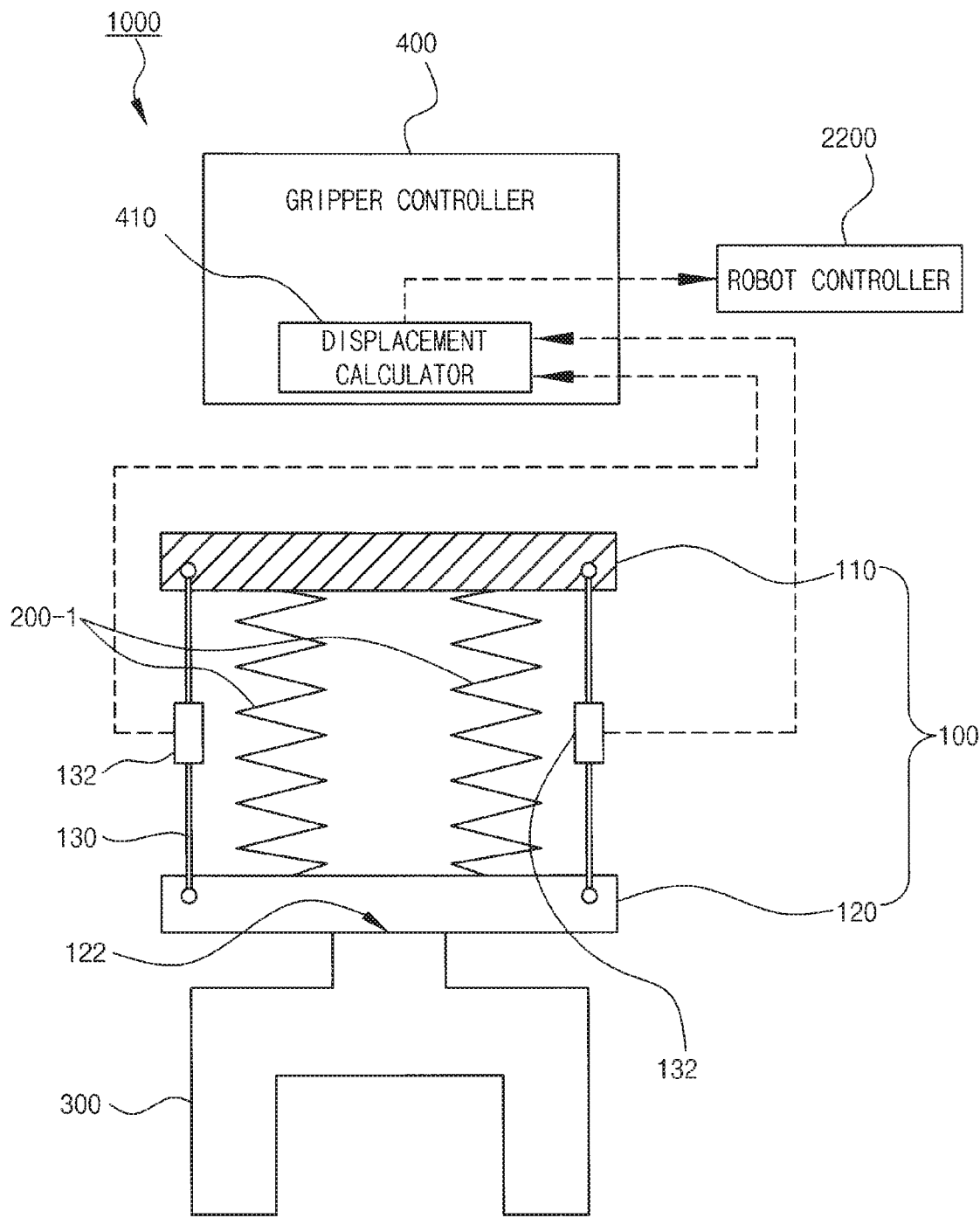
FIGS. 1 and 2 are conceptual diagrams illustrating a passive compliance gripper having a displacement measuring element capable of measuring displacement of the gripper due to an external force, according to an example embodiment of the present invention.

| * Reference numerals | |
|---|---|
| 1000, 1001, 1002: passive compliance gripper | |
| 100, 101, 102: passive compliance part | 110: upper structure |
| 111: inner groove | 112: flow channel |
| 120: lower structure | 121: inner groove |
| 122: gripper mount | 130: leg |
| 131: ball joint | 132: displacement measuring element |
| 140: cover | 200: variable compliance apparatus |
| 200-1: compliance apparatus | 300: gripper part |
| 310: finger block | 320: finger |

-continued

| * Reference numerals | |
|---|---|
| 400: gripper controller | 410: displacement calculator |
| 420: compliance controller | 430: compliance calculator |
| 2000: robot | 2100: arm |
| 2200: robot controller | 10: first component |
| 20: second component | 21: inserting hole |

DETAILED DESCRIPTION

Hereinafter, the embodiments of the present invention will be described in detail with reference to the accompanied drawings.

Figure 2:
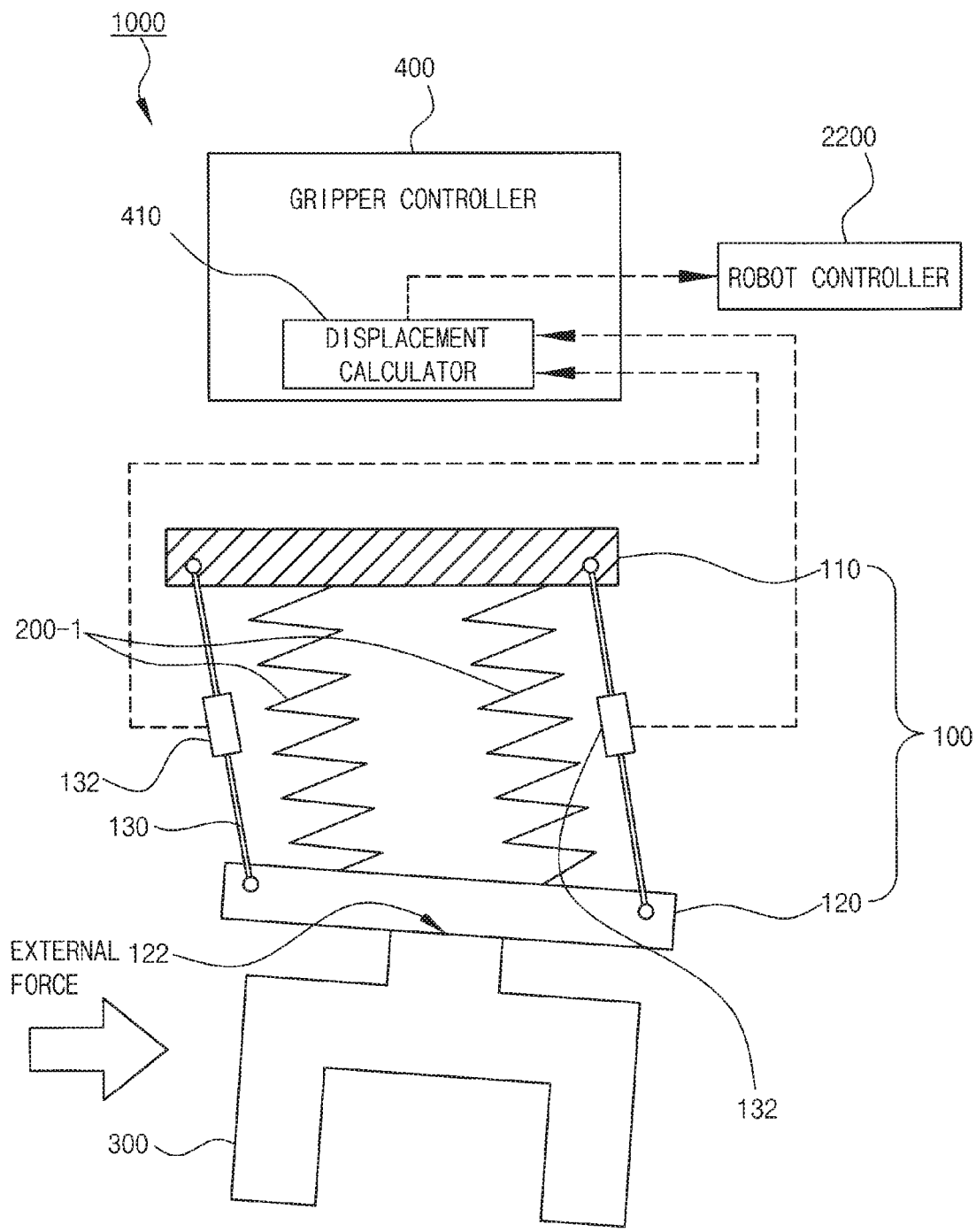

FIGS. 1 and 2 are conceptual diagrams illustrating a passive compliance gripper having a displacement measuring element capable of measuring displacement of the gripper due to an external force, according to an example embodiment of the present invention.

The passive compliance gripper 1000 according to the present example embodiment measures displacement of the gripper due to an external force.

Referring to FIGS. 1 and 2, the passive compliance gripper 1000 according to the present example embodiment, includes a passive compliance part 100, a displacement measuring element 132, and a gripper mount 122. A first end of the passive compliance part 100 is fixed, and a second end of the passive compliance part 100 is configured to be transformed. The displacement measuring element 132 is equipped to the passive compliance part 100, and measures displacement due to transformation of the passive compliance part 100. The gripper mount 122 is connected to the second end of the passive compliance part 100, and has a gripper part 300 gripping a component.

A first side of the passive compliance part 100 may be combined with a robot arm 2100 explained below. A second side of the passive compliance part 100 may be transformed with the first side thereof combined with the robot arm 2100.

Here, the second side of the passive compliance part 100 may be transformed with at least 2-degree of freedom. The external force applied, the passive compliance part 100 has compliance to be transformed in directions with at least 2-degree of freedom. Then, the external force removed, the passive compliance part 100 is restored to an original position due to elasticity, since the passive compliance part 100 has passive compliance.

Here, the passive compliance may be defined as the following that a second side is transformed with respect to a fixed first side when the external force is applied, and the second side is restored to an original position due to elasticity when the external force is removed. In addition, regarding at least 2-degree of freedom, the second side may be transformed along horizontal directions including a X-axis direction and a Y-axis direction, and may be additionally transformed along a Z-axis direction, a $\theta_X$ direction, a $\theta_Y$ direction, a $\theta_Z$ direction and so on.

In addition, the compliance is a material constant expressed as a ratio between deflection and strain, and is defined as quantity of deflection (movement or rotation) of a movable second side with respect to a fixed first side. The first (upper) and second (lower) sides of the passive compliance part 100 are connected to a compliance apparatus 200-1 having a predetermined stiffness, and thus the passive compliance part 100 may have predetermined compliance.

The displacement measuring element 132 may measure displacement due to transformation of the passive compliance part 100, and may measure displacement of at least 2-degree of freedom when the passive compliance part 100 transforms with at least 2-degree of freedom. Here, the displacement measuring element 132 may be a linear variable differential transformer (LVDT), but not limited thereto. The displacement measuring element 132 may be a single or a pair, and alternatively, the numbers or the kinds of the displacement measuring elements 132 may be variously changed.

The gripper mount 122 is formed at a second side of the passive compliance part 100, and a gripper part 300 is equipped to the gripper mount 122. Here, the gripper mount 122 may have various kinds of shape such that the gripper part 300 is stably and hardly fixed to the gripper mount 122. For example, the gripper mount 122 may have a groove shape or a combining element for the fixing with the gripper part 300.

In addition, the gripper part 300 equipped to the gripper mount 122 may grip a component for the assembly. For example, the gripper part 300 may be a finger shape, or may have various kinds of shapes profitable to the shape of the component or the shape of the assembled object.

Accordingly, in the passive compliance gripper 1000 according to the present example embodiment, the assembly status may be monitored by the displacement measuring element in assembling using the robot, to correct a path for the assembly by the robot, and thus the assembly speed and the assembly quality may be increased. In addition, the passive compliance gripper 1000 may be applied to various kinds of robots, and the user may easily and safely teach the robot assembly.

In addition, the passive compliance gripper 1000 further include a gripper controller 400 connected to the displacement measuring element 132, and the gripper controller 400 includes a displacement calculator 410. The displacement calculator 410 calculates a position of a lower portion of the gripper part 300, based on the displacement measured by the displacement measuring element 132.

The gripper controller 400 is connected to a robot controller 2200 controlling a robot moving path and a robot position, and thus provides a target moving path and a target position of the robot to the robot controller 2200 according to the displacement of the lower portion of the gripper part 300 calculated by the displacement calculator 410.

For example, when the gripper part 300 is transformed to have displacement due to an assembly error in assembling a component, the displacement calculator 410 calculates the position of the lower portion of the gripper part 300. Then, the calculated position of the lower portion of the gripper part 300 is transferred to the robot controller 2200, and thus the robot controller 2200 corrects the target moving path and the target position of the robot 2000. Here, when the assembly error exists, a first component 10 is inserted with the gripper part 300 transformed. Thus, the displacement measuring element 132 measures the quantity of the transformation of the gripper 300 and the position of the robot 2000 may be controlled such that the gripper part 300 is positioned to be a right position for the inserting.

Figure 3:
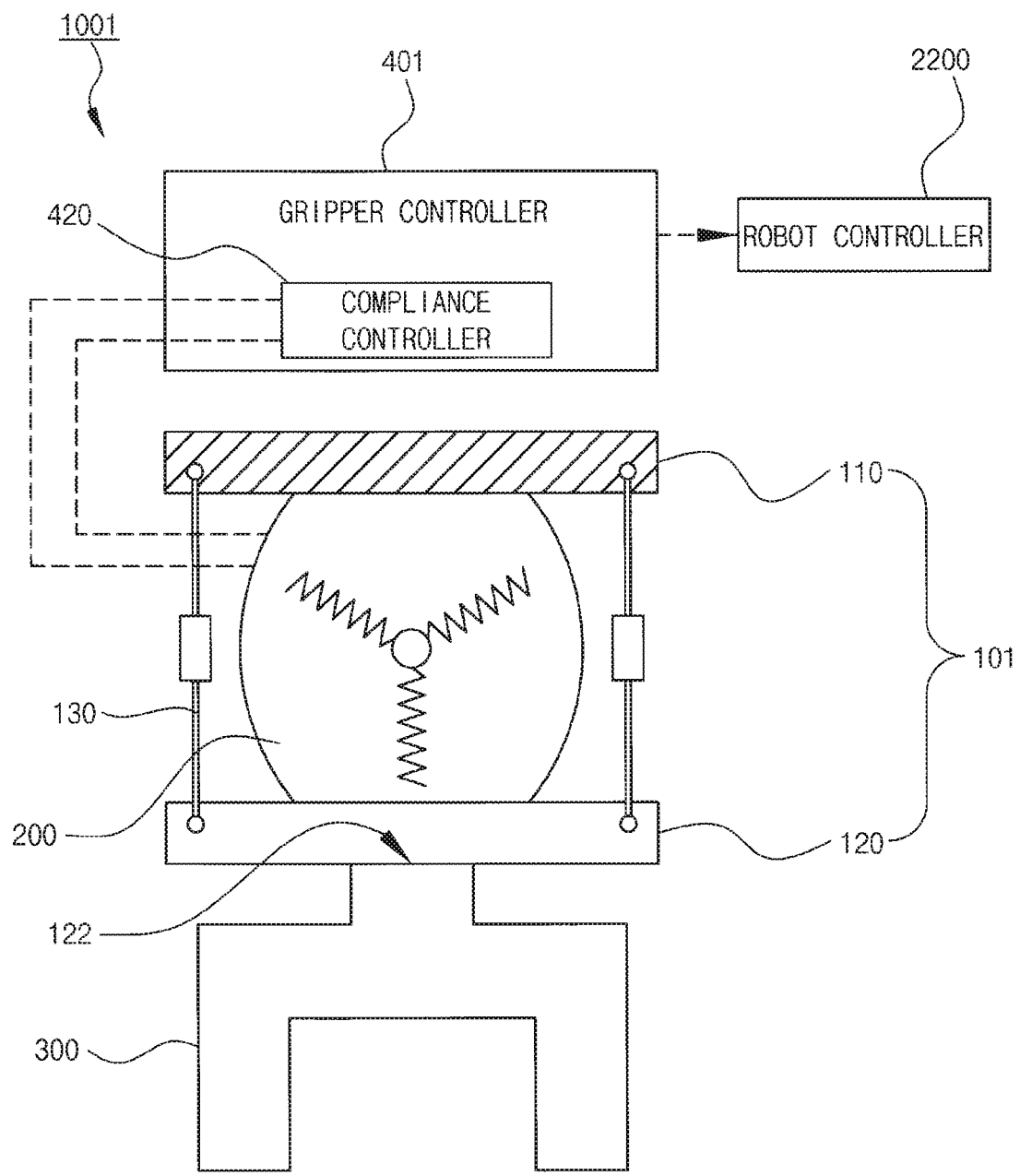
FIGS. 3 and 4 are conceptual diagrams illustrating a passive compliance gripper having variable passive compliance due to a compliance controller and a variable compliance apparatus, according to another example embodiment of the present invention.
Figure 4:
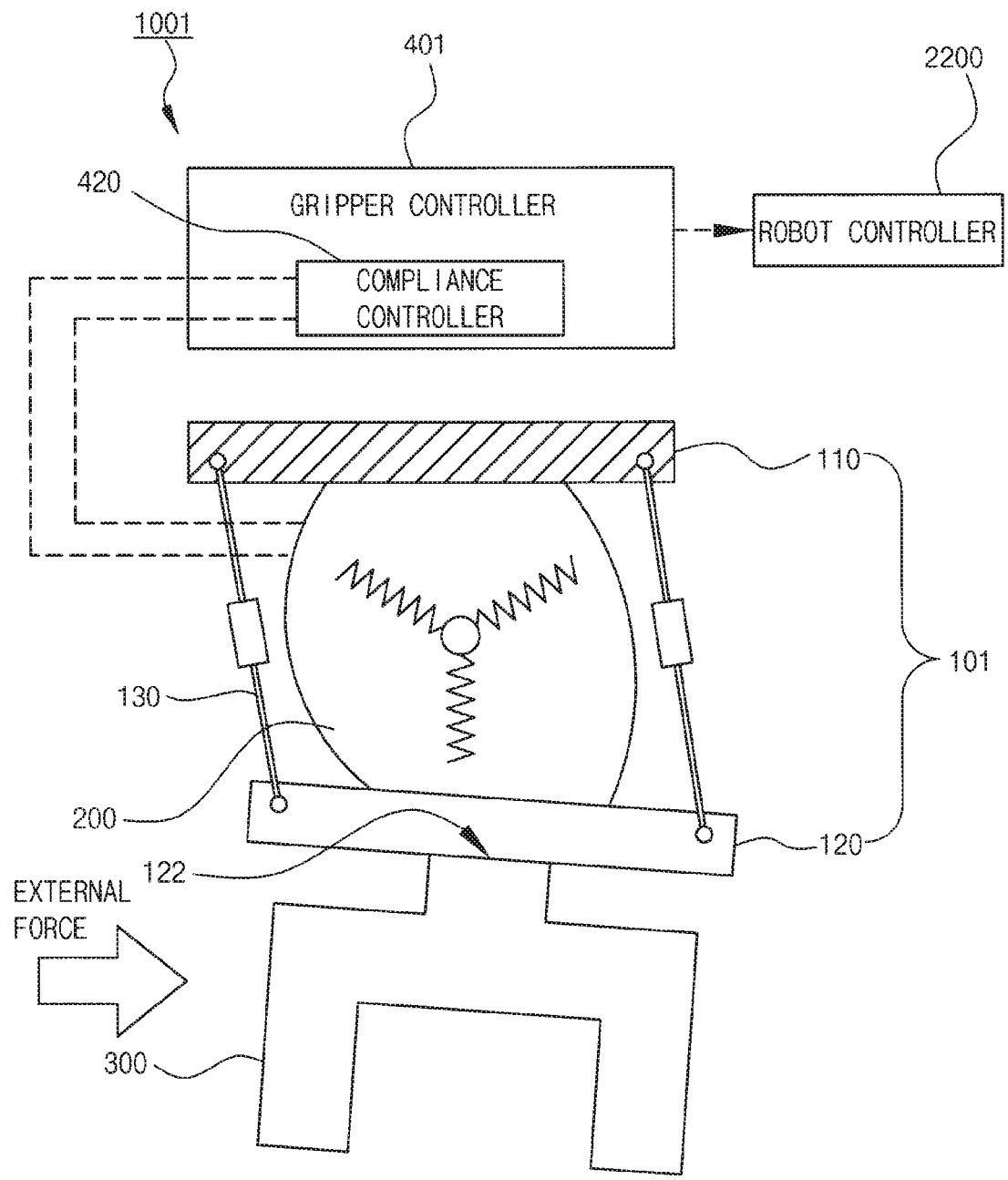

FIGS. 3 and 4 are conceptual diagrams illustrating a passive compliance gripper having variable passive compliance due to a compliance controller and a variable compliance apparatus, according to another example embodiment of the present invention.

The passive compliance gripper 1001 according to the present example embodiment is a variable passive compliance gripper in which the compliance is controlled to be variable.

The passive compliance gripper 1001 according to the present example embodiment is substantially same as the passive compliance gripper 1000 except for a passive compliance part 101, a variable compliance apparatus 200 and a gripper mount 401, and thus same reference numerals are used and any repetitive explanation will be omitted.

Referring to FIGS. 3 and 4, the passive compliance gripper 1001 according to the present example embodiment includes a passive compliance part 101, a variable compliance apparatus 200 and a gripper mount 122. The passive compliance part 101 forms compliance between first and second ends thereof and controls the compliance. The first end of the passive compliance part 101 is fixed. The second end of the passive compliance part 101 is configured to be transformed by the compliance. The variable compliance apparatus 200 is equipped to the passive compliance part 101, and changes the compliance. The gripper mount 122 is connected to the second end of the passive compliance part 101, and has a gripper part 300 gripping a component. The gripper part 300 is equipped to the gripper mount 122.

The passive compliance part 101 controls or changes the stiffness of the variable compliance apparatus 200, and thus, the passive compliance 101 may be transformed more easily or more hardly according to the stiffness of the variable compliance apparatus 200. In addition, the passive compliance part 101 may have various kinds of shapes for controlling or changing the stiffness of the variable compliance apparatus 200.

In addition, a first side of the passive compliance part 101 is combined with the robot arm 2100 mentioned below, and a second side of the passive compliance part 101 is transformed with the first side thereof fixed to the robot arm 2100.

As mentioned above, the second side of the passive compliance part 101 may be transformed with at least 2-degree of freedom. When an external force is applied, the passive compliance part 101 has compliance so as to be transformed along directions with at least 2-degree of freedom. In contrast, when the external force is not applied (removed), the passive compliance part 100 is restored to be an original position due to elasticity since the passive compliance part 100 has passive compliance. In addition, the first and second sides of the passive compliance part 101 are connected to the variable compliance apparatus 200 having stiffness, and thus the passive compliance part 101 has compliance.

The variable compliance apparatus 200 is disposed between the first and second sides of the passive compliance part 101. An upper side of the variable compliance apparatus 200 is combined with the first side of the passive compliance part 101, and a lower side of the variable compliance apparatus 200 is combined with the second side of the passive compliance part 101. In addition, the variable compliance apparatus 200 has stiffness, and the stiffness of the variable compliance apparatus 200 is variable. For example, the variable compliance apparatus 200 may include an elastic body like a spring, and an element changing the stiffness of the elastic body.

Thus, as the stiffness of the variable compliance apparatus 200 increases, the compliance of the passive compliance gripper decreases. In contrast, as the stiffness of the variable compliance apparatus 200 decreases, the compliance of the passive compliance gripper increases. Accordingly, when the positioning error or the machining error between the components of the assembled object is relatively small, the assembly may be performed easily even though the stiffness of the variable compliance apparatus 200 is relatively high. In contrast, when the positioning error or the machining error is relatively large, the stiffness of the variable compliance apparatus 200 may be controlled to be relatively small for the more easily assembly.

According to the passive compliance gripper in the present example embodiment, the variable passive compliance may be provided to be properly controlled based on the positioning error or the machining error of the components of the assembled object, and thus various compliance may be applied to various kinds of assemblies such as a vertical direction assembly or a horizontal direction assembly. Thus, the assembly speed and the assembly quality may be enhanced.

In addition, the passive compliance gripper 1001 further includes a gripper controller 401 to which the variable compliance apparatus is connected, and the gripper controller 400 includes a compliance controller 420 controlling the stiffness of the variable compliance apparatus 200.

As illustrated in the figure, the variable compliance apparatus 200 is connected to the gripper controller 401, and thus the stiffness of the variable compliance apparatus 200 may be controlled by the compliance controller 420 of the gripper controller 401. Here, when the assembly error is too large so that the component is not smoothly inserted or hard to be inserted, the stiffness of the variable compliance apparatus 200 is controlled to be decreased (the compliance of the variable compliance apparatus 200 is increased) by the compliance controller 420.

Alternatively, when the displacement of the gripper part 300 is relatively small or almost negligible in the assembly, in which the assembly may be easily performed even though the stiffness of the variable compliance apparatus 200 is relatively large, the stiffness of the variable compliance apparatus 200 is controlled to be increased (the compliance of the variable compliance apparatus 200 is decreased) by the compliance controller 420.

Thus, compared to the conventional assembly system necessary for an expensive force control based robot, the passive compliance gripper may be easily applied to various kinds of robots like a position control based robot, and a relatively easy and fast assembly system may be equipped without using the complex force control algorithm.

Figure 5:
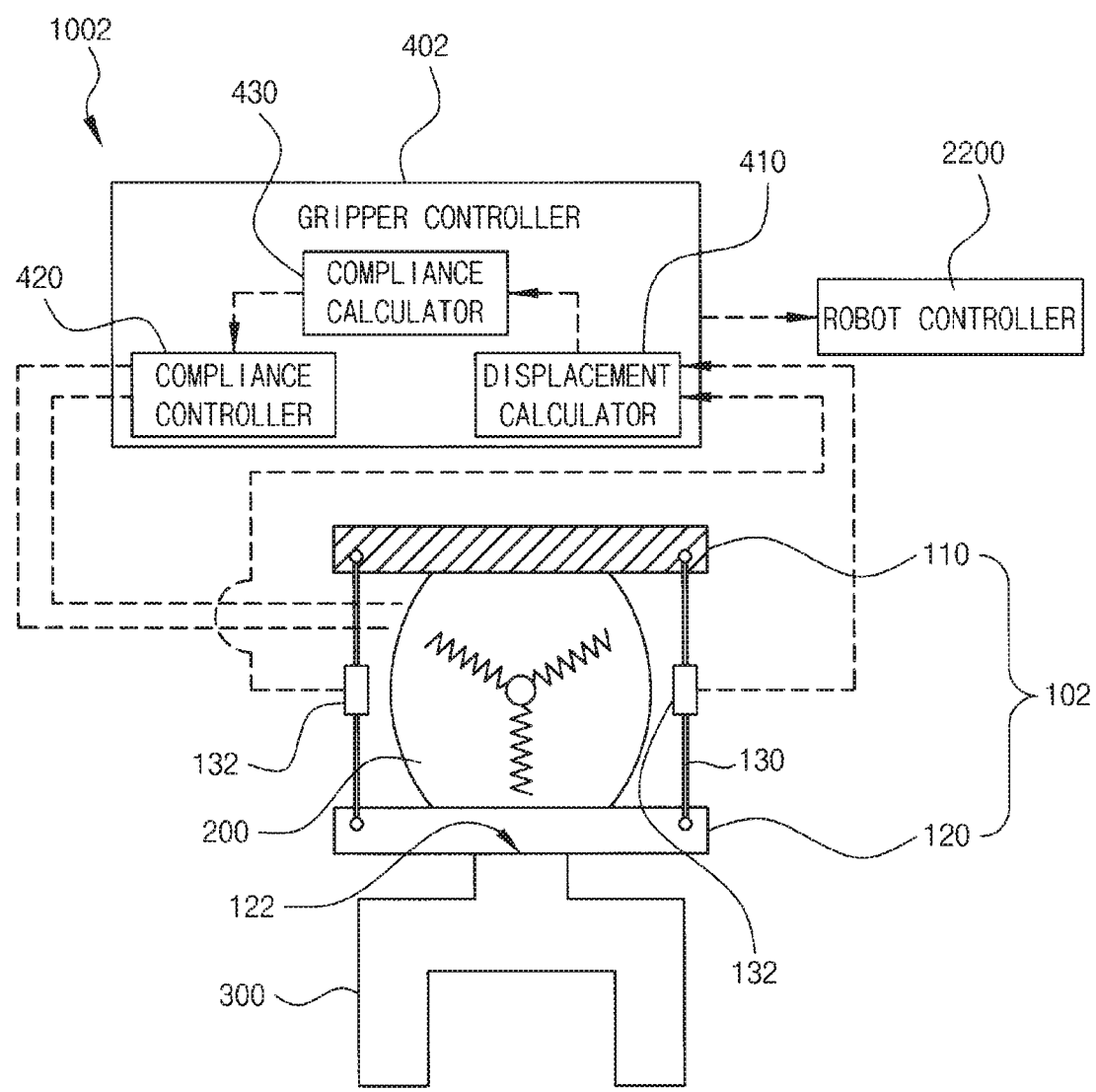
FIGS. 5 and 6 are conceptual diagrams illustrating a passive compliance gripper calculating compliance based on displacement of the gripper due to an external force, to properly apply compliance to the gripper, according to still another example embodiment of the present invention.
Figure 6:
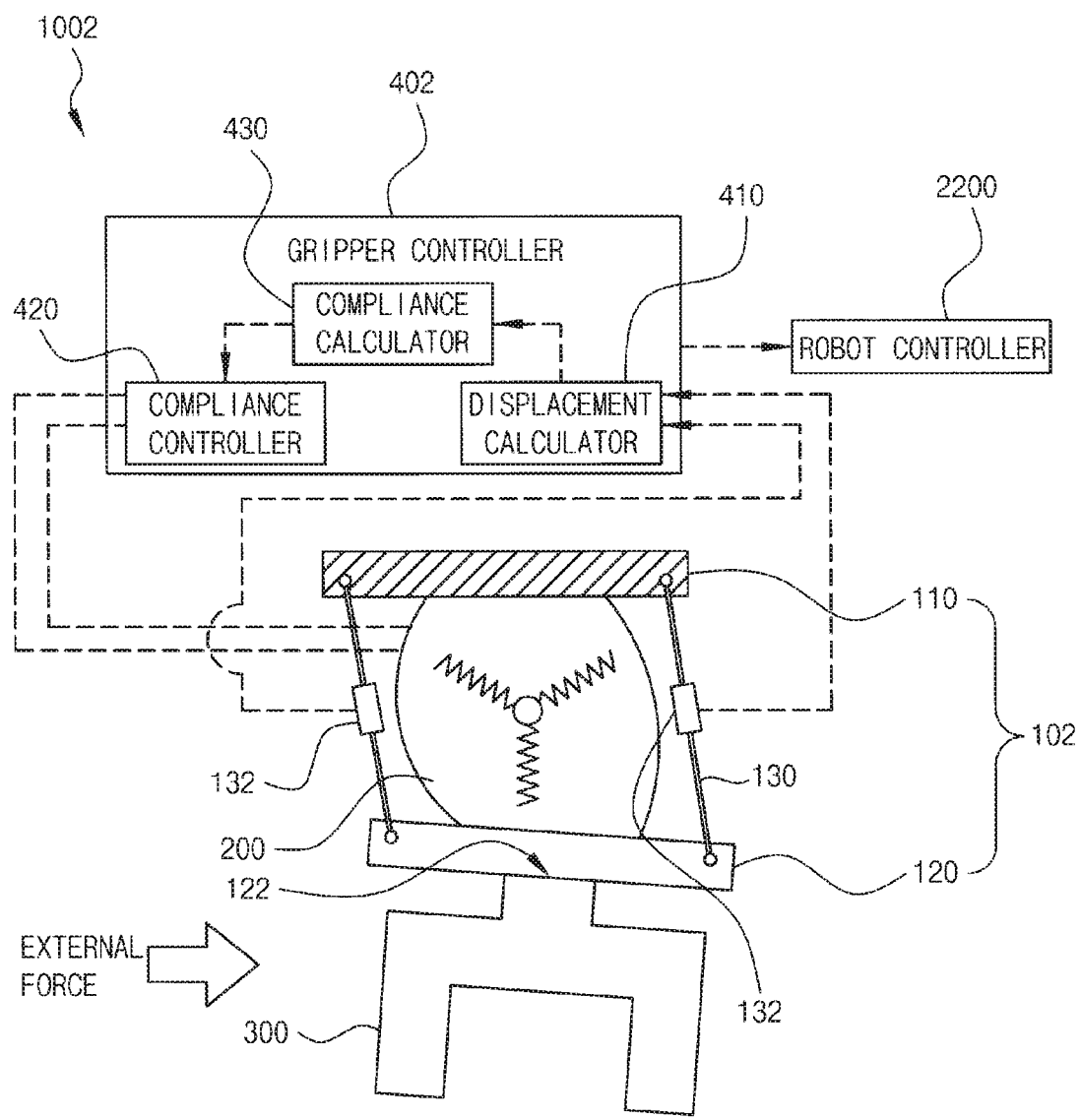

FIGS. 5 and 6 are conceptual diagrams illustrating a passive compliance gripper calculating compliance based on displacement of the gripper due to an external force, to properly apply compliance to the gripper, according to still another example embodiment of the present invention.

The passive compliance gripper 1002 according to the present example embodiment includes the functions of the passive compliance gripper 1000 explained referring to FIGS. 1 and 2 and the passive compliance gripper 1001 explained referring to FIGS. 3 and 4, and thus may measure the displacement and control the compliance.

Thus, the passive compliance gripper 1002 according to the present example embodiment is substantially same as the passive compliance grippers 1000 and 1001, except for a passive compliance part 102 and a gripper controller 402, and thus same reference numerals are used and any repetitive explanation will be omitted.

Referring to FIGS. 5 and 6, the passive compliance gripper 1002 according to the present example embodiment includes a passive compliance part 102, a variable compliance apparatus 200, a displacement measuring element 132 and a gripper mount 122. The passive compliance part 102 forms compliance between first and second ends thereof and controls the compliance. The first end of the passive compliance part 102 is fixed. The second end of the passive compliance part 102 is configured to be transformed by the compliance. The variable compliance apparatus 200 is equipped to the passive compliance part 102, and changes the compliance. The displacement measuring element 132 is equipped to the passive compliance part 102, and measures displacement due to transformation of the passive compliance part 102. The gripper mount 122 is connected to the second end of the passive compliance part 102, and has a gripper part 300 gripping a component. The gripper part 300 is equipped to the gripper mount 122.

The passive compliance part 102 controls or changes the compliance of the variable compliance apparatus 200, and thus, the passive compliance 102 may be transformed more easily or more hardly according to the stiffness of the variable compliance apparatus 200. In addition, the passive compliance part 102 may have various kinds of shapes for controlling or changing the stiffness of the variable compliance apparatus 200.

In addition, the variable compliance apparatus 200 is disposed between the first and second sides of the passive compliance part 102. An upper side of the variable compliance apparatus 200 is combined with the first side of the passive compliance part 102, and a lower side of the variable compliance apparatus 200 is combined with the second side of the passive compliance part 102. In addition, the variable compliance apparatus 200 has stiffness, and the stiffness of the variable compliance apparatus 200 is variable. For example, the variable compliance apparatus 200 may include an elastic body like a spring, and an element changing the stiffness of the elastic body.

Thus, as the stiffness of the variable compliance apparatus 200 increases, the compliance of the passive compliance gripper decreases. In contrast, as the stiffness of the variable compliance apparatus 200 decreases, the compliance of the passive compliance gripper increases. Accordingly, when the positioning error or the machining error between the components of the assembled object is relatively small, the assembly may be performed easily even though the stiffness of the variable compliance apparatus 200 is relatively high. In contrast, when the positioning error or the machining error is relatively large, the stiffness of the variable compliance apparatus 200 may be controlled to be relatively small for the more easily assembly.

According to the passive compliance gripper 1002 in the present example embodiment, the variable passive compliance may be provided to be properly controlled based on the positioning error or the machining error of the components of the assembled object, and thus various compliance may be applied to various kinds of assemblies such as a vertical direction assembly or a horizontal direction assembly.

In addition, the passive compliance gripper 1002 further includes a gripper controller 402 to which the variable compliance apparatus 200 is connected, and the gripper controller 402 includes a compliance controller 420 controlling the stiffness of the variable compliance apparatus 200, in addition to the displacement calculator 410 as explained referring to FIGS. 1 and 2.

As illustrated in the figure, the variable compliance apparatus 200 is connected to the gripper controller 402, and the stiffness of the variable compliance apparatus 200 is controlled or changed by the compliance controller 420 of the gripper controller 402.

Here, the displacement measuring element 132 is further connected to the gripper controller 402, and the displacement measuring element 132 calculates the position of the lower portion of the gripper part 300 based on the displacement measured by the displacement measuring element 132.

The gripper controller 402 includes a compliance calculator 430 connected to the displacement calculator 410 and the compliance controller 420. The compliance calculator 430 calculates proper target compliance for the assembly based on the position of the lower portion of the gripper part 300 calculated by the displacement calculator 410, and then the stiffness of the variable compliance apparatus 200 is controlled by the compliance controller 420.

The compliance controller 420 and the displacement measuring element 132 are connected to the gripper controller 402. Thus, when the gripper part 300 is transformed due to the assembly error in inserting the component for the assembly, the position of the lower portion of the gripper part 300 is calculated by the displacement calculator 410 of the gripper controller 402 using the measured values from the displacement measuring element 132. Thus, it is decided whether the gripper part 300 is transformed for the component to be smoothly or easily inserted or not.

Thus, when the assembly error is too large so that the component is not smoothly inserted or hard to be inserted, the compliance calculator 430 calculates the stiffness for the component to be easily or smoothly inserted, and the stiffness of the variable compliance apparatus 200 is controlled to be decreased (the compliance of the variable compliance apparatus 200 is increased) by the compliance controller 420 based on the calculated stiffness. Alternatively, when the displacement of the gripper part 300 is relatively small or almost negligible in the assembly, in which the assembly may be easily performed even though the stiffness of the variable compliance apparatus 200 is relatively large, the stiffness of the variable compliance apparatus 200 is controlled to be increased (the compliance of the variable compliance apparatus 200 is decreased) by the compliance controller 420, so that the vibration of the lower portion of the gripper part 300 may be decreased.

In addition, as explained above, the gripper controller 402 is connected to the robot controller 2200 controlling the moving path and the position of the robot 2000, and thus the gripper controller 402 may provide the target moving path and the target position of the robot 2000 to the robot controller 2200 based on the displacement of the lower portion of the gripper part 300 calculated by the displacement calculator 410.

The stiffness of the variable compliance apparatus 200 is controlled based on the displacement of the lower portion of the gripper part 300, and here, the position of the lower portion of the gripper part 300 calculated by the displacement calculator 410 of the gripper controller 402 is transferred to the robot controller 2200, so that the robot controller 2200 may correct the target moving path and the target position of the robot 2000.

Figure 7:
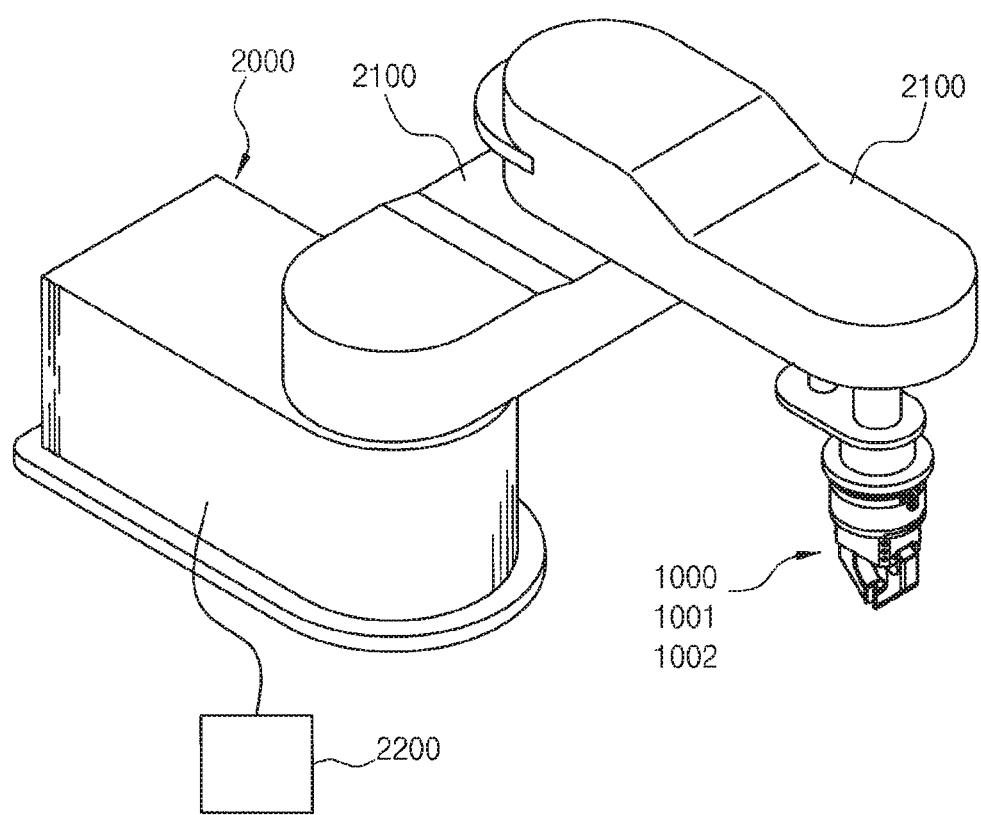
FIG. 7 is a perspective view illustrating the passive compliance gripper in FIGS. 1 to 6 equipped to a robot arm.

FIG. 7 is a perspective view illustrating the passive compliance gripper in FIGS. 1 to 6 equipped to a robot arm.

Referring to FIG. 7, the passive compliance gripper 1000, 1001 and 1002 according to the example embodiments mentioned above is combined with an end portion of an arm 2100 of the robot 2000, and for example, may be used for assembling and inserting the component to the assembled object, in which the component is gripped by the gripper part 300 and is moved to the position for the assembly.

Hereinafter, the examples of structures in which the passive compliance gripper 1000, 1001 and 1002 is embodied or manufactured, are explained in detail. In addition, the passive compliance gripper 1000, 1001 and 1002 explained referring to FIGS. 1 to 6 may be embodied or manufactured as the following examples, but for the convenience of explanation, the passive compliance gripper capable of measuring the displacement and controlling the compliance will be explained as an example. Thus, the passive compliance gripper 1002 in FIGS. 5 and 6 is explained as an example, and likewise, the passive compliance part 102 and the gripper controller 402 in FIGS. 5 and 6 are explained as an example.

Here, the displacement measuring and the compliance controlling may be selectively applied, and thus one of the displacement measuring and the compliance controlling may be applied and then the other thereof may not be applied in the example.

Figure 8:
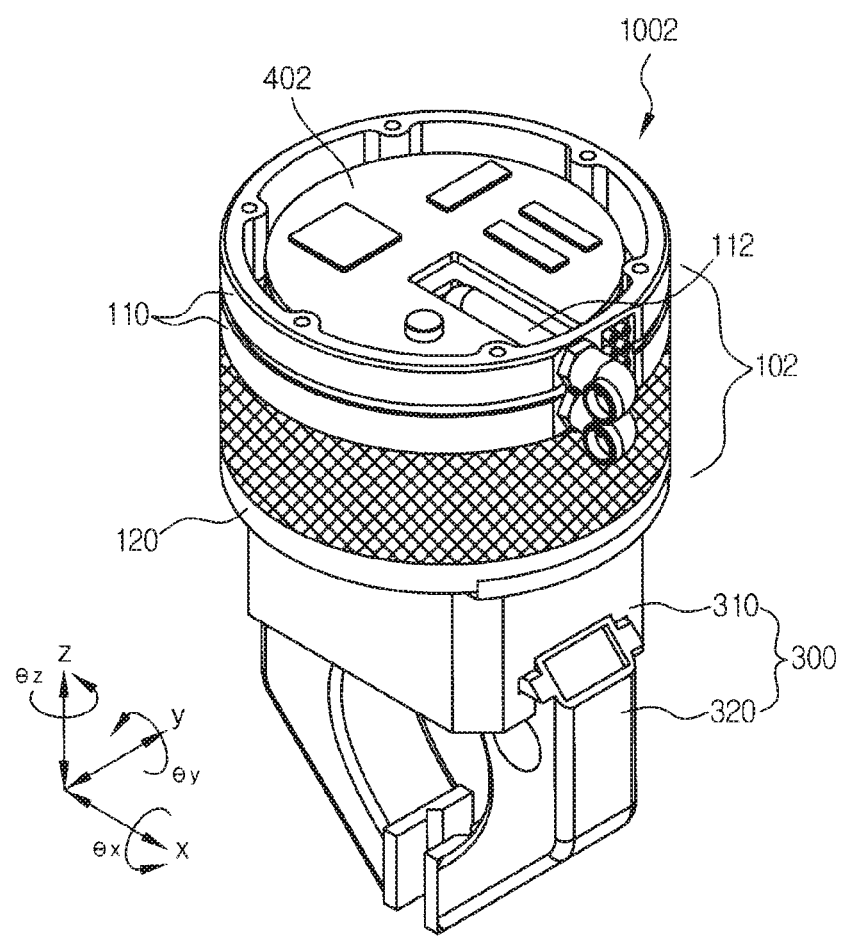
FIGS. 8 and 9 are perspective and exploded perspective views illustrating the passive compliance gripper of FIG. 7.
Figure 9:
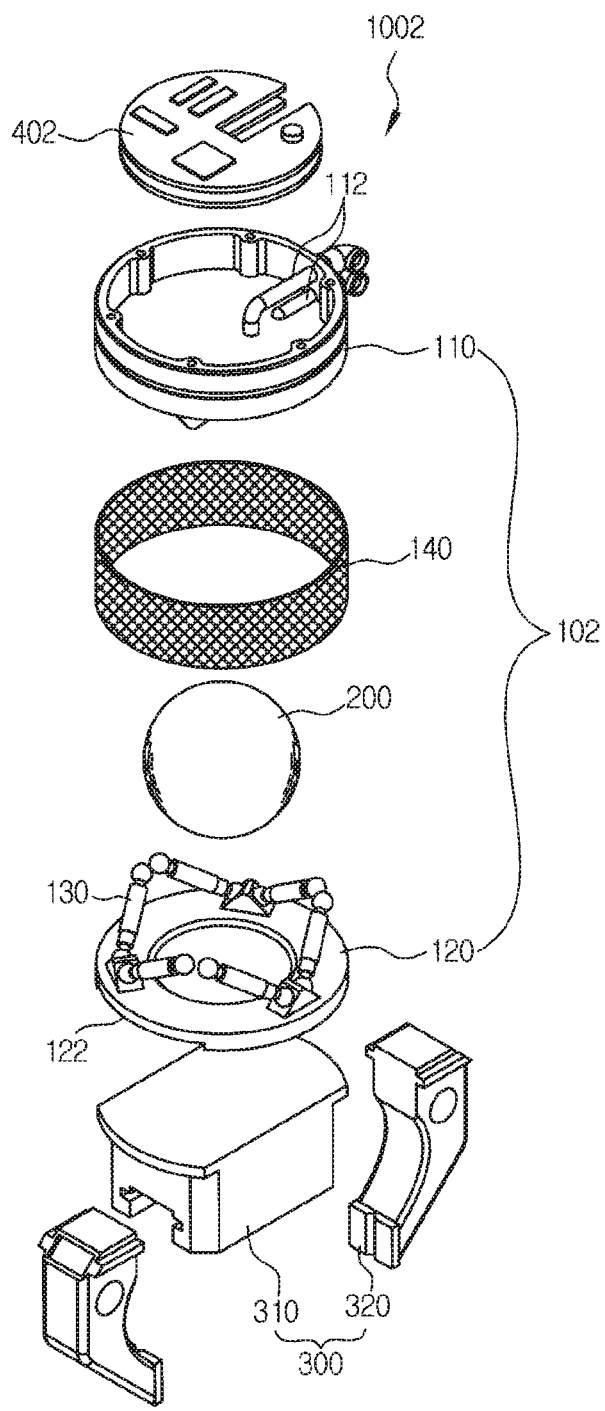
Figure 10:
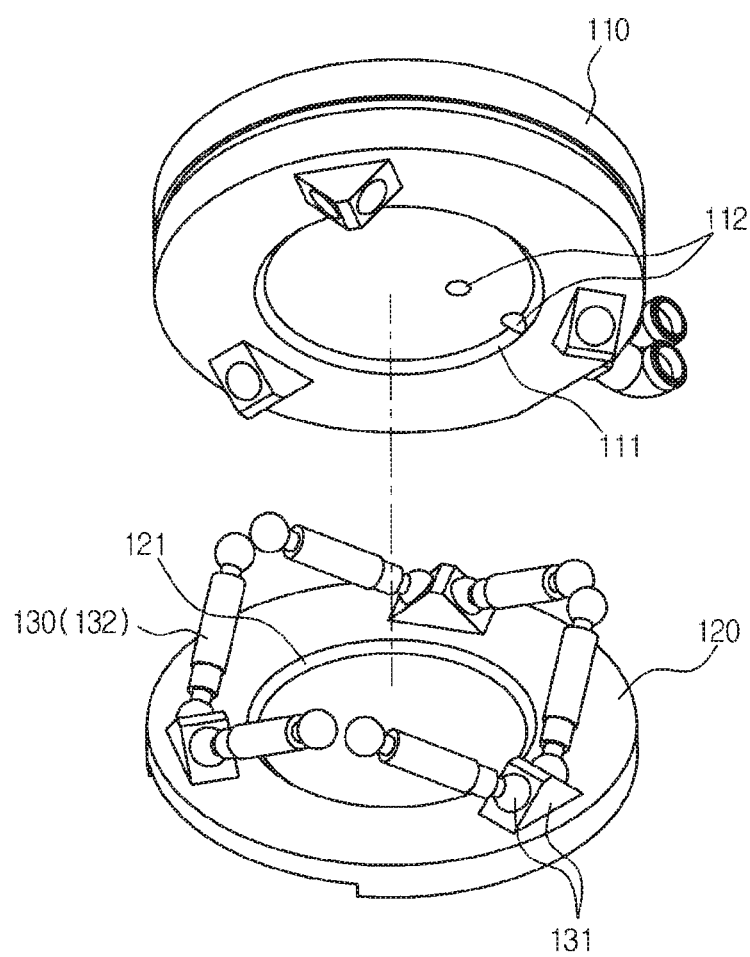
FIG. 10 is an exploded perspective view illustrating Stewart platform applied to the passive compliance gripper of FIG. 9.
Figure 11:
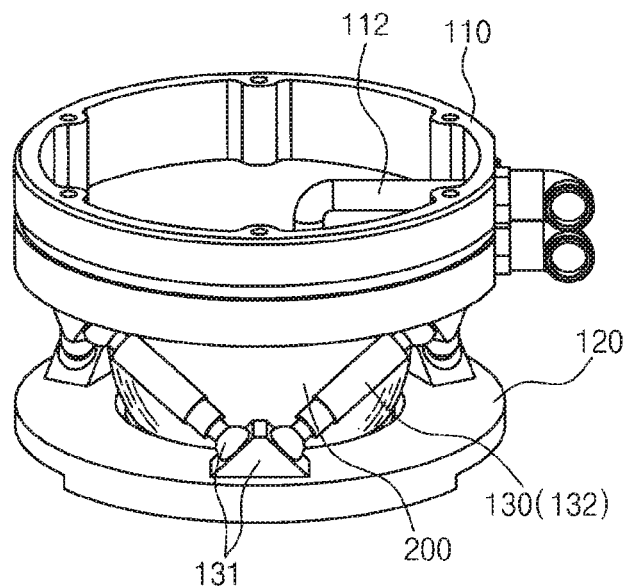
FIGS. 11 and 12 are perspective and front views illustrating an assembly of the Stewart platform and a balloon applied to the passive compliance gripper of FIG. 9.
Figure 12:
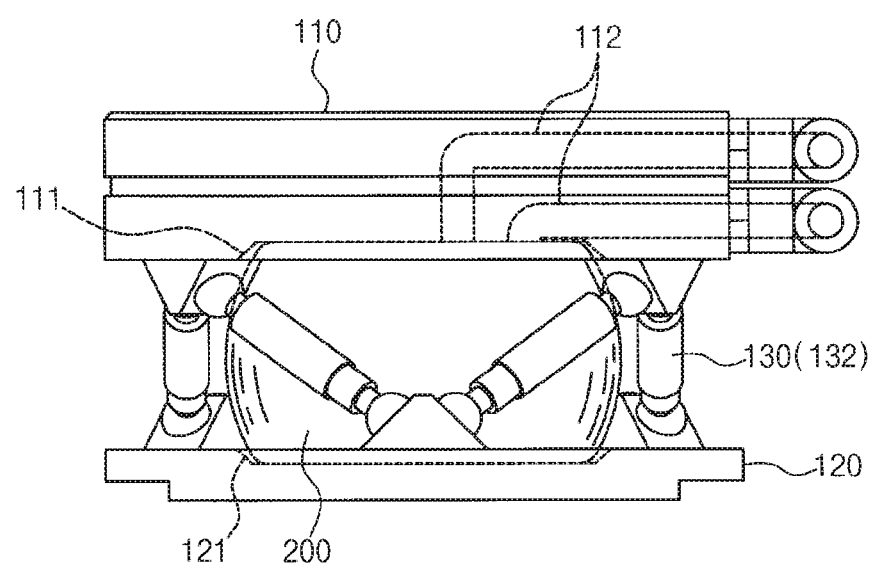

FIGS. 8 and 9 are perspective and exploded perspective views illustrating the passive compliance gripper of FIG. 7. FIG. 10 is an exploded perspective view illustrating Stewart platform applied to the passive compliance gripper of FIG. 9. FIGS. 11 and 12 are perspective and front views illustrating an assembly of the Stewart platform and a balloon applied to the passive compliance gripper of FIG. 9.

As illustrated in the figure, in the passive compliance gripper 1002, for example, the passive compliance part 102 may be Stewart platform, and the variable compliance apparatus 200 may be a balloon in which the compliance is controlled or changed.

Thus, hereinafter, the passive compliance part is called as the Stewart platform 102, and the variable compliance apparatus is called as the balloon 200.

In the passive compliance gripper 1002, the Stewart platform 102 includes an upper structure 110, and a lower structure 120 disposed under the upper structure 110 and spaced apart from the upper structure 110.

Here, a plurality of legs 130 may be disposed between the upper and lower structures 110 and 120, and both ends of the legs 130 are respectively connected to the upper and lower structures 110 and 120. The legs 130 are stretchable, and the displacement measuring element 132 may be equipped to the legs 130.

In addition, the balloon 200 is disposed inside of the Stewart platform 102, and may include an elastic material so that the pressure of the balloon 200 may be controlled.

In addition, the gripper part 300 is combined with the lower structure 120 of the Stewart platform 102, and grips the component.

For example, in the Stewart platform 102, the upper structure 110 may be a circular plate shape, and an upper surface of the upper structure 110 may be combined with an end portion of the arm 2100 of the robot 2000. A plurality of combining holes having an internal screw thread is formed on the upper surface of the upper structure 110, and thus the upper structure 110 is tightly combined or fixed to the end portion of the arm 2100 via a combining element.

The lower structure 120 may be a circular plate shape, and the gripper part 300 is combined with the lower structure 120 for gripping the component.

Each of the legs 130 connects the upper structure 110 with the lower structure 120. An upper portion of the leg 130 is connected to a lower surface of the upper structure 110, and a lower portion of the leg 130 is connected to an upper surface of the lower structure 120. The legs 130 are stretchable, and thus the lower structure 120 may move and rotate freely with the upper structure 110 fixed.

In addition, the leg 130 is disposed between the upper structure 110 and the lower structure 120, and is disposed at inner sides of the upper and lower structures 110 and 120 adjacent to end sides of the upper and lower structures 110 and 120. For example, the leg 130 may be disposed in an area within diameters of the upper and lower structures 110 and 120, and the leg may be disposed in relatively outer sides with respect to centers of the upper and lower structures 110 and 120.

The legs 130, for example, may be six, and the legs 130 adjacent to each other are disposed inclined with each other along an opposite direction. Two legs 130 adjacent to each other are disposed such that upper ends of two legs 130 connected to the upper structure 110 are adjacent to each other and lower ends of two legs 130 connected to the lower structure 120 are also adjacent to each other.

Accordingly, the upper structure 110, the lower structure 120 and the legs 130 form the Stewart platform 102.

The balloon 200 may be a spherical balloon. A compressed air is supplied and exhausted to control the pressure inside of the balloon 200. Here, the balloon 200 is expanded or contracted according as the compressed air is supplied or exhausted, and the pressure of the balloon 200 is increased or decreased according as the compressed air is supplied or exhausted.

The balloon 200 is disposed inside of the Stewart platform 102. The balloon 200 is disposed between the upper and lower structures 110 and 120 forming the Stewart platform 102, and is attached to the upper and lower structures 110 and 120. The balloon 200 is enclosed by the legs 130. Here, the balloon 200 is spaced apart from the legs 130, and thus the balloon 200 does not make contact with the legs 130 even though the balloon 200 is expanded.

The gripper 300 is a part gripping the component, and includes a finger block 310 and a pair of fingers 320. The finger block 310 is combined with the lower surface of the lower structure 120, and the pair of fingers 320 is combined with the finger block 310 to grip the component.

Here, the fingers 320 are spread or contracted to grasp the component or to release the component. For example, as illustrated in the figure, the fingers 320 may be slid with the finger block 310 to be combined with the finger block 310. The finger block 310 may include an actuator for spreading or contracting the fingers 320. Alternatively, various kinds of driving modules for driving the fingers 320 may be equipped.

Figure 13:
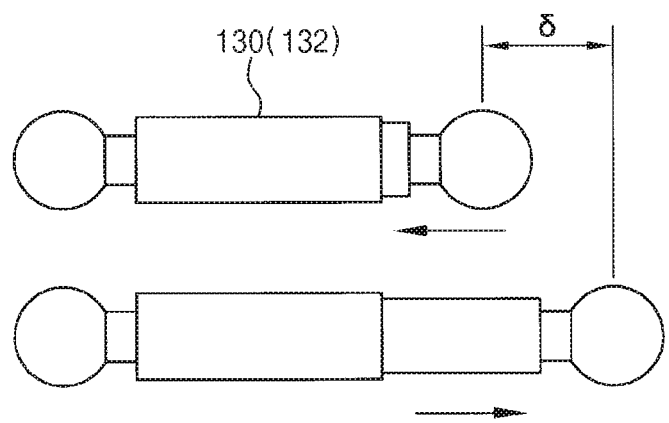
FIG. 13 is a side view illustrating linearly displacement of a leg of Stewart platform in FIG. 10.
Figure 14:
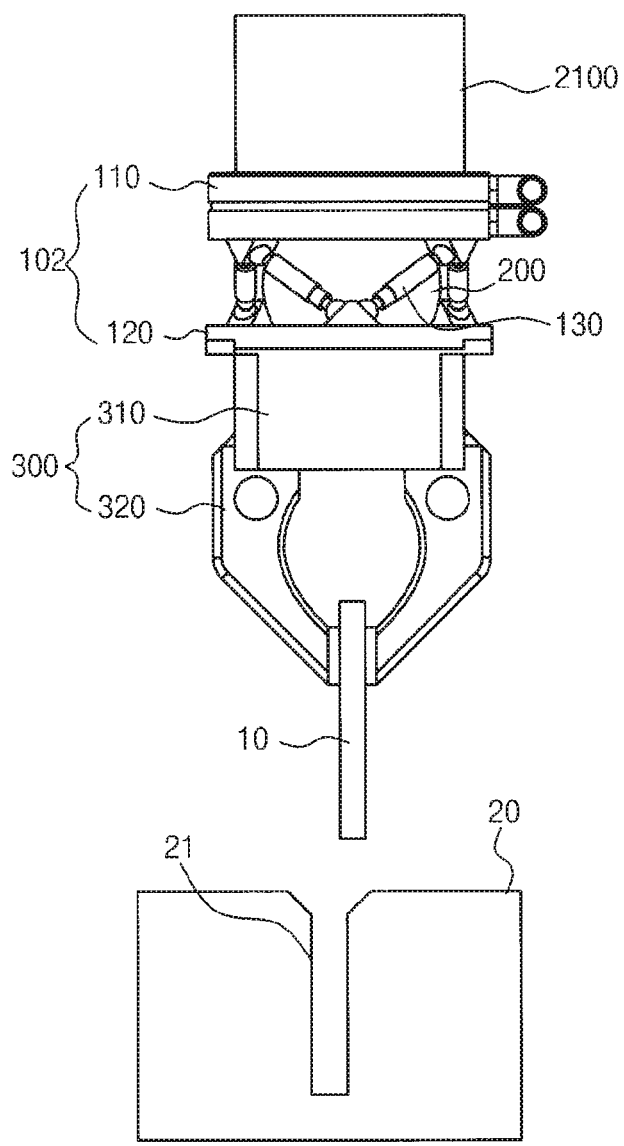
FIGS. 14 and 15 are front views illustrating an assembly of a first component to a second component with transforming the passive compliance gripper of FIG. 7.
Figure 15:
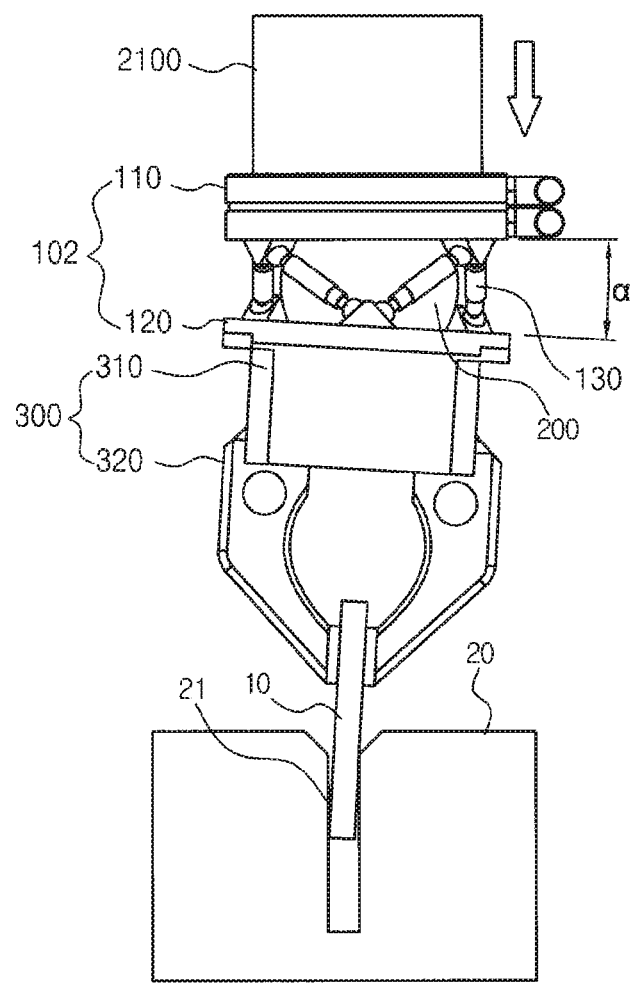
Figure 16:
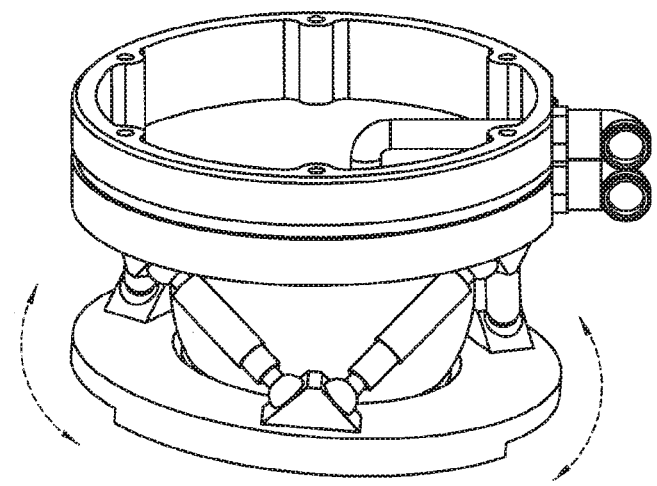
FIGS. 16 to 19 are perspective and front views illustrating transformation of a lower structure with an upper structure fixed, in the passive compliance gripper of FIG. 7.
Figure 17:
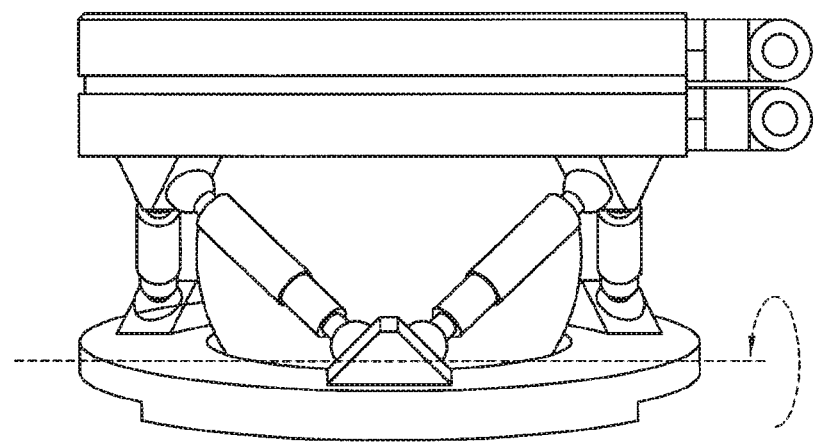
Figure 18:
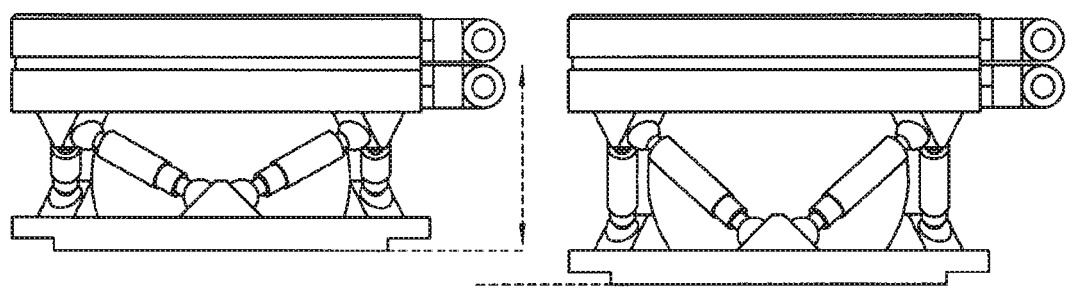
Figure 19:
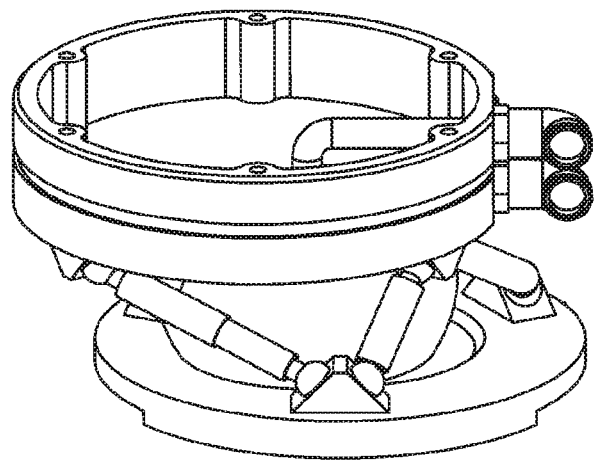

FIG. 13 is a side view illustrating linearly displacement of a leg of Stewart platform in FIG. 10. FIGS. 14 and 15 are front views illustrating an assembly of a first component to a second component with transforming the passive compliance gripper of FIG. 7.

Referring to FIGS. 14 and 15, when the component is inserted into a hole of the assembled object so as for the assembly, using the passive compliance gripper, the first component 10 which is inserted into the hole is grasped by the finger 320, and is moved into the position at which an inserting hole 21 of the second component 20.

Then, the first component 10 is inserted into the inserting hole 21. Here, when the first component 10 is not aligned with the inserting hole 21 due to an error, or when a central axis of the first component 10 is not aligned with the inserting hole 21, the first component 10 may be inserted into the inserting hole 21 with the gripper part 300 and the lower structure 120 moving along a horizontal direction together, or as illustrated in FIG. 15, the first component 10 may be inserted into the inserting hole 21 with the lower structure 120 inclined with respect to the upper structure 110 by an angle of α, which means that the gripper part 300 is inclined with respect to a vertical direction, or the first component 10 may be inserted into the inserting hole 21 with the gripper part 300 twisted or not aligned with respect to the vertical direction.

Here, the compliance of the gripper part 300 is controlled or changed according to an inner pressure of the balloon 200 disposed between the first and second structures 110 and 120 inside of the Stewart platform 102. Thus, the compliance of the gripper part 300 is decreased as the stiffness of the balloon 200 increases by increasing the inner pressure thereof, so that the component may be inserted into the inserting hole when the error is relatively small. In contrast, the compliance of the gripper part 300 is increased as the stiffness of the balloon 200 decreases by decreasing the inner pressure thereof, so that the component may be easily or smoothly inserted into the inserting hole even though the error is relatively large. Here, the position or the direction of the gripper part may be changed or controlled relatively easily, due to the relatively large compliance thereof.

Here, as explained above, the compliance is a material constant expressed as a ratio between deflection and strain, and is defined as quantity of deflection (movement or rotation) of the movable lower structure 120 with respect to the fixed upper structure 110.

Accordingly, the pressure of the balloon 200 is controlled such that the compliance of the passive compliance gripper 1002 is controlled. Thus, the passive compliance gripper 1002 may be applied to every assembly robot including the robot assembling the component having a relatively large error or having a relatively small error, and may be applied to various kinds of assembly circumstances such as a vertical direction assembly, a horizontal direction assembly and so on.

In addition, the assembly may be performed easily even though the assembly error is relatively large, and thus the teaching may be performed more easily and more safely even though the position is hard to be verified by user's eyes.

FIGS. 16 to 19 are perspective and front views illustrating transformation of a lower structure with an upper structure fixed, in the passive compliance gripper of FIG. 7.

Referring to FIGS. 16 to 19, the Stewart platform 102 may be formed to move along X, Y and Z directions and to rotate along $\theta_X$, $\theta_Y$, and $\theta_Z$ directions, and thus the lower structure 120 may have a 6-degree of freedom.

Thus, in the assembly, the gripper part moves along at least one of X. Y and Z directions or rotates along at least one of $\theta_X$, $\theta_Y$, and $\theta_Z$ directions, and thus the position and the angle of the assembly may be corrected.

In addition, the legs 130 are stretchable linearly, and both ends of the legs 130 are combined with the upper and lower structures 110 and 120 via a ball joint 131.

For example, length of the legs 130 may be increased or decreased linearly like a linear actuator, and may be a hydraulic or pneumatic cylinder. The legs 130 are stretchable linearly within a predetermined stroke distance to generate displacement 6 as illustrated in FIG. 13. The length of the legs 130 is changed due to the external force.

A spherical ball is combined with both ends of the legs 130. The ball is inserted into the upper structure 110 or the lower structure 120, and the legs 130 is combined with the upper and lower structure 110 and 120 via the ball joint 131 so that the ball is not released and is freely rotated. Alternatively, various kinds of elasticity or shapes capable of not being released and freely rotated or bended may be applied instead of the ball joint 131. The upper structure 110 is forced to be estranged from the lower structure 120 due to the elasticity of the balloon 200, and thus the lengths of the legs 130 are in the maximum without the external force and the upper and lower structures 110 and 120 are parallel with each other.

In addition, an inner groove 111 and 121 is formed at each of the lower surface of the upper structure 110 and the upper surface of the lower structure 120, and the upper and lower sides of the balloon 200 are inserted into and adhered to the inner groove 111 and 121.

As illustrated in FIGS. 6 to 8, the upper and lower sides of the balloon 200 is inserted into and tightly adhered to the inner groove 111 and 121, and thus the Stewart platform 102 may be more easily restored into the original status without the external force due to the elasticity of the balloon 200. Since the position of the balloon 200 is fixed, the legs 130 do not make contact with the balloon 200, even though a volume of the balloon is changed or a structure of the Stewart platform 102 is changed. Thus, the Stewart platform 102 may be changed more freely.

In addition, a flow channel 112 through which the compressed air is provided and exhausted is formed at the upper structure 110, and the balloon 200 is connected to the flow channel 112.

As illustrated in FIG. 11, the compressed air is provided to the balloon 200 or is exhausted from the balloon 200 through the flow channel 112.

For example, the flow channel 112 may be a pipe so as to be connected to the balloon 200, and the balloon 200 may be integrally or separately formed with the flow channel 112. In addition, the upper structure 110 has a groove at which the flow channel 112 is disposed. Alternatively, the upper structure 110 has the flow channel 112 as a hole shape in itself, and the balloon 200 is connected to the flow channel 11 of the upper structure 110.

In addition, one touch pitting or quick coupling is combined with an end portion of the flow channel 112, for connecting a pneumatic hose. Although a hole through which the compressed air is provided or exhausted, is not shown in the figure, a hole or a tube is formed at the balloon 200 to be connected to the flow channel 112. Here, the flow channel 112 is formed or combined with the upper structure 110 of the Stewart platform 102 and is connected to the variable compliance apparatus 200, and thus the Stewart platform 102 including the flow channel 112 are formed as the passive compliance part. The passive compliance part in which the elasticity of the variable compliance apparatus 200 is controlled using the flow channel 112, may be an example of the passive compliance part.

The displacement measuring element 132 explained referring to FIGS. 1 to 6, is fixed at each of the legs 130, and thus the linear displacement of each of the legs 130 is measured by the displacement measuring element 132.

The displacement measuring element 132 measures the length of each of the legs 130, and is inserted into each of the legs 130. Alternatively, the displacement measuring element 132 may be disposed outside of each of the legs 130 or the displacement measuring element 132 may be the leg 130 in itself.

Here, the displacement measuring element 132 may be a linear variable differential transformer (LVDT), an encoder, a potentiometer, and so on.

In addition, as mentioned above, the gripper controller 402 calculates the lower portion of the gripper part 300 based on the displacement measured by the displacement measuring element 132, to control the position of the gripper.

The displacement measuring element 132 is connected to the gripper controller 402, and thus when the gripper part 300 is transformed due to the assembly error in inserting the component, the gripper controller 402 calculates the lower portion of the gripper part 300 using the displacement measured by the displacement measuring element 132. In addition, the position of the robot 2000 is controlled using the calculated position of the lower portion of the gripper part 300, to correct the position of the gripper.

When the assembly error exists, the first component 10 is inserted with the gripper part 300 transformed. Thus, the transformation of the gripper part 300 is measured by the displacement measuring element 132, and the gripper controller 402 controls the position of the robot 2000 such that the gripper is positioned at an exact inserting position for the first component 10 to be exactly inserted.

Here, the gripper controller 402 is connected to the robot controller 2200 controlling the moving path and the position of the robot 2000, and thus the target moving path and the target position of the robot 2000 are provided to the robot controller 2200 base on the displacement of the lower portion of the gripper part 300 calculated by the displacement measuring element 410 of the gripper controller 402.

Accordingly, the passive compliance gripper finds out the assembly status and corrects the path of the assembly position, and thus the assembly speed and the assembly quality may be increased.

In addition, the gripper controller 402 controls the pressure of the balloon 200 based on the displacement measured by the displacement measuring element 132. The displacement measuring element 132 is connected to the gripper controller 402, and the gripper controller 402 calculates the position of the lower portion of the gripper part 300 based on the displacement measured by the displacement measuring element 132 when the gripper part 300 is transformed due to the assembly error in assembling the component. Thus, it may be decided whether the gripper part 300 is transformed such that the component is smoothly inserted or not.

When the assembly error is large enough not to be smoothing inserted, the gripper controller 402 decreases the pressure of the balloon 200 to increase the compliance such that the gripper part 300 may be transformed more easily. Thus, the component may be easily and smoothly inserted even though the gripper part 300 is transformed.

In contrast, when the assembly is not performed or the gripper part 300 is less transformed or not transformed in the assembly, the gripper controller 402 increases the pressure of the balloon 200 to decrease the compliance such that the gripper part 300 is hard to be transformed and a vibration of the gripper part 300 is decreased.

Accordingly, the stiffness of the variable compliance apparatus 200 is controlled based on the displacement of the lower portion of the gripper part 300, and here, the position of the lower portion of the gripper part 300 calculated by the displacement calculator 410 of the gripper controller 402 is transferred to the robot controller 2200, and thus the robot controller 2200 may correct the target moving path and the target position of the robot 2000.

The gripper controller 402 is disposed at the upper side of the upper structure, and the inside of the upper structure 110 is hollow and upper side thereof is open such that the gripper controller 402 is positioned at the inner side of the upper structure 110. Alternatively, the gripper controller 402 may be separately disposed to be connected to the balloon 200 or the displacement measuring element 132, or the gripper controller 402 is integrally formed with the robot controller 2200, and not limited thereto.

A cover 140 having a flexible material is combined around the upper structure 110 and the lower structure 120 to enclose the outside of the legs 130. Here, the cover 140 may be a mesh, an elastic material film, and so on.

The balloon 200 as the variable compliance apparatus, may be replaced with various types of variable compliance apparatuses not the balloon type explained above, and for example, a combination of a spring and a compliance bar having stiffness may be applied.

The balloon 200 may be replace with the combination of the spring and the compliance bar to be formed as the variable compliance apparatus, and the combination thereof may function and operate substantially same as the balloon 200 mentioned above.

Alternatively, various kinds of variable compliance apparatus may be used substitute for the balloon 200.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A passive compliance gripper comprising:
    a passive compliance part, a first end of the passive compliance part being fixed, a second end of the passive compliance part being configured to be transformed;
    a displacement measuring element equipped to the passive compliance part, and configured to measure a displacement of the second end of the passive compliance part due to transformation of the passive compliance part;
    a gripper mount connected to the second end of the passive compliance part, and having a gripper part for gripping a component; and
    a displacement calculator connected to the displacement measuring element and configured to calculate a position of the gripper part based on the displacement measured by the displacement measuring element.

2. The passive compliance of claim 1,
    wherein the position of the gripper part is a position of a lower portion of the gripper part.

3. The passive compliance of claim 2, wherein the gripper controller provides a target moving path and a target position of a robot to a robot controller, based on the position of the lower portion of the gripper part.

4. A passive compliance gripper comprising:
    a passive compliance part forming compliance between first and second ends thereof and controlling the compliance, the first end of the passive compliance part being fixed, the second end of the passive compliance part being configured to be transformed by the compliance and to be restored to an original position due to elasticity;
    a variable compliance apparatus equipped to the passive compliance part, and changing the compliance;
    a gripper mount connected to the second end of the passive compliance part, and having a gripper part gripping a component; and
    a compliance controller connected to the variable compliance apparatus and configured to control the compliance of the variable compliance apparatus.

5. The passive compliance gripper of claim 4, wherein the passive compliance part comprises:
    an upper structure; and
    a lower structure disposed under the upper structure, and spaced apart from the upper structure.

6. The passive compliance gripper of claim 5, wherein the upper structure and the lower structure move relatively with a 6-degree of freedom.

7. The passive compliance gripper of claim 5, wherein the gripper part is connected to a lower part of the lower structure.

8. The passive compliance gripper of claim 5, wherein the variable compliance apparatus is a balloon which is disposed between the upper and lower structures and an inner pressure of which is controlled.

9. The passive compliance gripper of claim 8, wherein the balloon comprises an elastic material.

10. The passive compliance gripper of claim 8, wherein an inner groove is formed on each of a lower surface of the upper structure and an upper surface of the lower structure, and upper and lower sides of the balloon are respectively inserted and attached to the inner grooves.

11. The passive compliance gripper of claim 8, wherein a flow channel is formed at the upper structure, a compressed air is supplied and exhausted through the flow channel, and the balloon is connected to the flow channel.

12. The passive compliance gripper of claim 4, further comprising a displacement measuring element equipped to the passive compliance part, and measuring displacement due to transformation of the passive compliance part.

13. The passive compliance gripper of claim 12, wherein the passive compliance part comprises an upper structure, and a lower structure disposed under and spaced apart from the upper structure,
wherein the displacement measuring element is equipped to each of legs which are stretchable and are connected to both ends of the upper and lower structures.

14. The passive compliance gripper of claim 13, wherein each of the legs is linearly stretchable, and provides a 3-degree of freedom to each of the upper and lower structures.

15. The passive compliance gripper of claim 4, wherein the gripper controller is connected to the displacement measuring element, and comprises a displacement calculator calculating a position of a lower portion of the gripper part based on the displacement measured by the displacement measuring element.

16. The passive compliance gripper of claim 15, wherein the gripper controller further comprises a compliance calculator connected to the compliance controller and the displacement calculator,
wherein the compliance calculator calculates compliance, and the compliance controller controls the compliance of the variable compliance apparatus, based on the position of the lower portion of the gripper part calculated by the displacement calculator.

17. The passive compliance gripper of claim 16, wherein the gripper controller provides a target moving path and a target position of a robot to a robot controller, based on the position of the lower portion of the gripper part.

18. A passive compliance gripper comprising:
a passive compliance part forming compliance between first and second ends thereof and controlling the compliance, the first end of the passive compliance part being fixed, the second end of the passive compliance part being configured to be transformed by the compliance;
a variable compliance apparatus equipped to the passive compliance part, and changing the compliance; and
a gripper mount connected to the second end of the passive compliance part, and having a gripper part gripping a component,
wherein the passive compliance part comprises:
an upper structure; and
a lower structure disposed under the upper structure, and spaced apart from the upper structure,
wherein the variable compliance apparatus is a balloon which is disposed between the upper and lower structures and an inner pressure of which is controlled, and
wherein a flow channel is formed at the upper structure, a compressed air is supplied and exhausted through the flow channel, and the balloon is connected to the flow channel.

* * * * *